United States Patent Office 3,788,817
Patented Jan. 29, 1974

3,788,817
MAKING AMMONIUM POLYPHOSPHATE IN A PACKED COLUMN
John L. Kolbe, Clarksville, and Casimer C. Legal, Jr., Elkridge, Md., assignors to W. R. Grace & Co., New York, N.Y.
Original application Jan. 26, 1970, Ser. No. 5,571, now Patent No. 3,650,727. Divided and this application June 1, 1971, Ser. No. 148,943
Int. Cl. C05b 1/06
U.S. Cl. 23—259.2
4 Claims

ABSTRACT OF THE DISCLOSURE

Hydrolysis of ammonium polyphosphate can be significantly delayed and reduced when the hot freshly made ammonium polyphosphate reaction mixture, still under pressure, is passed through a column containing an inert packing e.g. tabular alumina, silicon carbide, or porcelain.

This is a divisional of U.S. Ser. No. 5,571, filed Jan. 26, 1970, Ammonium Polyphosphate Improvement, now U.S. Pat. 3,650,727, issued Mar. 21, 1972.

BACKGROUND

Hydrolysis has always been a problem connected with the storage of ammonium polyphosphates for use as fertilizers. Generally hydrolysis takes place within a matter of days following the preparation of ammonium polyphosphate which is to be used in preparing the fertilizer and following the preparation of that fertilizer. This, of course, has lessened the usefulness of the fertilizer in that it has not been able to be stored for any extended period of time.

Ammonium polyphosphates (APP) are used in the production of liquid fertilizers. When used in preparing these liquid fertilizers it has been found that there is a tendency for sludging to occur if the fertilizer is not quickly used. Various attempts have been made to decrease this sludging, including increasing or decreasing the temperatures at which one of the ingredients, ammonium polyphosphate, is prepared.

In preparing liquid fertilizers, ammonium polyphosphate is mixed with water and ammonia, to which one may then add potash, urea, and, if desired, more water, to prepare various ratios of nitrogen:$P_2O_5$:$K_2O$. These ratios will vary according to the geographical area and the user's specification. However, prior to this invention, it was necessary to make quick use of the fertilizer after it had been prepared due to the hydrolysis and sludging.

One of the solutions to this problem has been to neutralize the phosphoric acid which has been prepared for the production of the ammonium polyphosphate, with ammonia, ammonia hydroxide or potassium hydroxide, allowing the impurities to precipitate then filtering or centrifuging out the precipitate to obtain a clear solution. However, this is difficult and expensive because the precipitate is very finely divided and gelatinous, which makes filtering almost impossible, and also results in loss of $P_2O_5$.

The use of certain other methods results in a product of low quality or low analysis unless some other means can be found to reduce the hydrolysis and sludge formation which normally takes place following the preparation of ammonium polyphosphate solutions.

Such a method is described in this invention.

OBJECTS

An object of this invention is to provide a means for improving the properties of ammonium polyphosphate (APP) for use in fertilizer products.

It is further an object of this invention to provide a means for reducing the rate of hydrolysis which normally takes place in ammonium polyphosphate and in solutions made therefrom.

Another object of this invention is to reduce the amount of sludge which normally forms in liquid fertilizers prepared from ammonium polyphosphate.

It is also an object of this invention to provide a means of lengthening the amount of time for which ammonium polyphosphate and the fertilizer prepared from said polyphosphate, can be stored without losing its desirable qualities.

Hydrolysis of liquid ammonium polyphosphate solutions is a serious problem in commercial practice. It has been shown for example, that storage of these solutions in large out-door tanks results in the loss of 2–3 or more percent per month of the original polyphosphate content. The rate of hydrolysis loss depends on several factors. It is known, for example, that the higher the temperature the greater the hydrolysis. Storage at 100° F. can result in the loss of 7 or 8 percent polyphosphate content per month. Storage at 32° F. results in negligible hydrolysis loss, but such storage is impractical for commercial use. Other conditions being equal, hydrolysis loss will be greater for higher contents of $P_2O_5$, relative to nitrogen. The hydrolytic effect has been described in the literature, for example, Journal of Agricultural Food Chemistry, vol. 13, No. 3, p. 168, 1965.

It is, therefore, a paramount object of the invention to reduce the hydrolysis of ammonium polyphosphate solutions.

FORMATION AND HYDROLYSIS OF AMMONIUM POLYPHOSPHATE

The formation of ammonium polyphosphate requires the intramolecular dehydration of phosphoric acid in at least three stages. As carried out in the process of this invention, this dehydration is very rapid and is believed to take place as soon as the hot reaction mixture is ejected from the reactor into the stirring pot. The dehydration is believed not to take place to any substantial degree inside the reactor, since it is known that ammonium polyphosphate hydrolyzes rapidly in the presence of water, at the high reaction temperatures obtained. Once outside the reactor, however, water readily separates from the hot product as steam (since it is now at atmospheric pressure), and hydrolysis is no longer instantaneous.

In view of the dehydration mechanism set out, it will be evident that little or no molecular dehydration takes place within the packed column. Thus, the ammonium polyphosphate has no contact with the packing. Rather, the precursor ammonium phosphates of the hot pressurized reaction mixture make the necessary contact, and the beneficial effect of the packing persists in the subsequently formed polyphosphate molecules.

This intramolecular dehydration, with final formation of ammonium tripolyphosphate, is shown in the accompanying series of equations. It will be borne in mind that, at the instant of dehydration, it is probably not the free acid which is dehydrating, but its ammonium salt. However, to simplify the equations following the dehydration of the acids themselves is shown, with addition of $NH_3$ to one of the principal final products (tripolyphosphoric acid). It will be further evident that a series of such dehydration acids is formed, e.g., dimer (pyrophosphoric acid), trimer (tripolyphosphoric acid), tetramer, pentamer, and so on. This series of polyphosphoric acids is well-known and for purposes of convenience in the fertiizer art is frequently referred to as "non-ortho $P_2O_5$." (Herein, unless otherwise stated, a given percentage of non-ortho $P_2O_5$ means the percentage of total $P_2O_5$ which is non-ortho $P_2O_5$. Thus, if total $P_2O_5$ is 59% of the total ammonium polyphosphate product, and non-ortho $P_2O_5$ is 32%, this means that $.32 \times 59 = 18.9\%$ of the total ammonium polyphosphate product is non-ortho $P_2O_5$.)

Along these lines then, the preparation of ammonium polyphosphates can be summarized as follows:

(1)

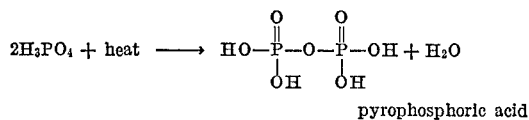

pyrophosphoric acid (2)

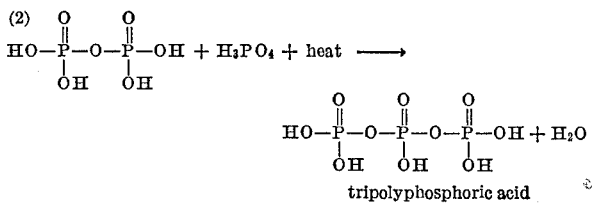

tripolyphosphoric acid (3)

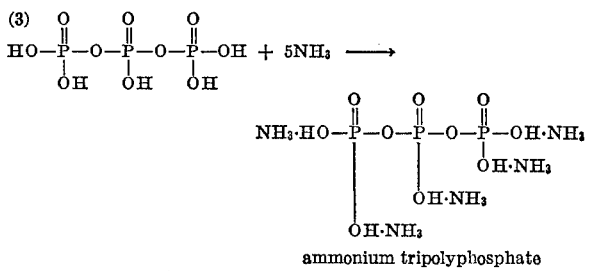

ammonium tripolyphosphate

When hydrolysis occurs the reactions proceed in the opposite direction, i.e., water combines with the ammonium polyphosphate to cause its return to the ortho form. In a liquid fertilizer this water is readily accessible but with the dry APP, the problem also exists as hereinafter explained.

The rehydration of the polyphosphate anion to orthophosphate in ammonium polyphosphate of the prior art begins almost immediately with the formation of the polyphosphate molecule, and thereafter, for ammonium polyphosphate stored as a solid, proceeds at the rate of about 3% per month, based on the original polyphosphate content. Thus, a prior art solid ammonium polyphosphate containing 25 weight percent of non-ortho phosphate ($P_2O_5$ basis) would, in two months, lose about $$2 \times .03 \times 25,$$

or 1.5 percentile points of its non-ortho $P_2O_5$ leaving it with 23.5 weight percent of non-ortho $P_2O_5$. In five months the loss would be 15 percent, resulting in the loss of 3.75 percentile points of non-ortho $P_2O_5$, to give 21.25 percent. During this five-month period, in which the prior art product has, on the average, lost about 15 percent of its non-ortho $P_2O_5$, the ammonium polyphosphate of the instant invention, stored as a solid, has lost non, or very little, of its non-ortho $P_2O_5$; which is to say, passing the ammonium polyphosphate melt through a packed column, as herein described, delays the start of hydrolysis by about five months. After hydrolysis begins in the solid polyphosphate of this invention it proceeds at about the same rate as with the prior art product, i.e., about 3 percent per month. However, owing to the initial stabilization against hydrolysis caused by the packed column, the solid product of this invention has always (on the average) about 15 percent more of its original polyphosphate content than the prior art product.

Our experiments have shown that when our solid APP product is hermetically sealed in a dry atmosphere, reversion of non-ortho phosphate to ortho-phosphate nevertheless will proceed. Under these conditions we have not been able to establish whether the non-ortho-phosphate anion is drawing water from within the pellet, or whether, in fact, water is a reactant in this mechanism at all; nevertheless the reversion to ortho-phosphate has been clearly established under these conditions. For the sake of consistency, reversion of solid APP to ortho-phosphate, where the mechanism is herein described, may be referred to as a hydrolysis, although as noted, there may be real doubt as to whether the mechanism is a hydrolysis in the classical sense. The term hydrolysis, however, is apparently accurate in the classical sense for reversion of APP to ortho-phosphate in aqueous solutions.

For reasons unknown, this hydrolysis can be delayed by using a packed column in the preparation of the APP.

DETAILED DESCRIPTION

The process of this invention comprises reacting anhydrous ammonia and phosphoric acid under pressure to form a reaction product which is then passed through a packed column before being allowed to cool.

Figure 1:
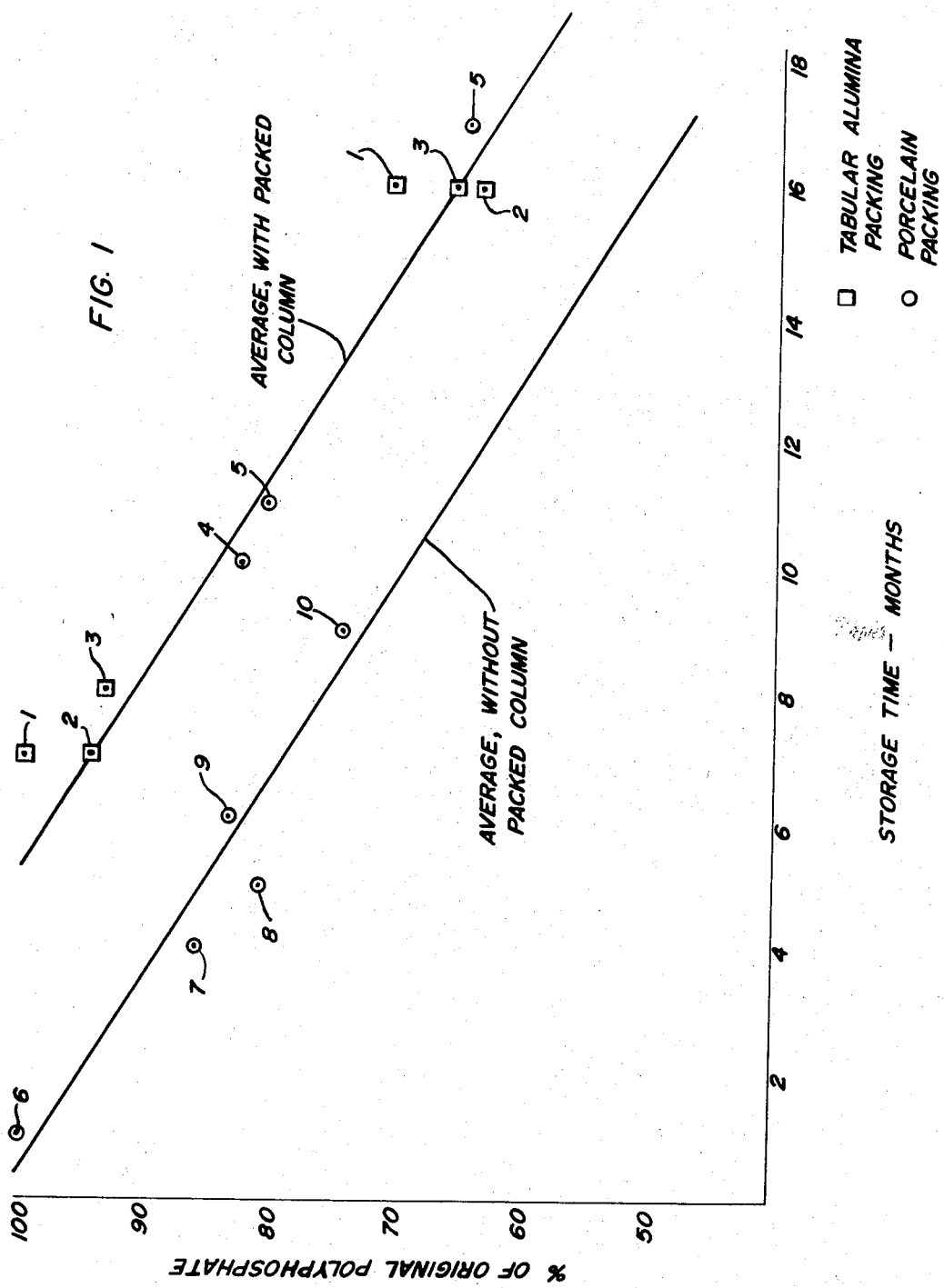
FIG. 1 is a graph which illustrates the advantage of using this invention to prepare APP which is to be stored in a solid or dry state for a period of time before being used in a preparation of fertilizers.

Referring now to FIG. 1 which illustrates the effects of hydrolysis on dry ammonium polyphosphate (APP), it can be seen that for almost 5 months after the ammonium polyphosphate was prepared (using a packed column) 100 percent of the original polyphosphate still remained, i.e., hydrolysis had not taken place. After 14 months of storage about 72 percent of the original polyphosphate which was formed with apparatus using a packed column, still remained but only about 57 percent is obtained when a packed column is not used.

THE PACKING

The type of inert packing is not critical. It should of course, not be affected by the reaction mixture, nor by the temperature and pressure conditions of the reactor. (For example, the metal turnings referred to in U.S. Pat. 3,375,063 are readily dissolved, and of course, such materials cannot be used as packing in this invention.) However, a large number of inert, temperature resistant materials are suitable and are commercially available, e.g., the vitreous or refractory materials, such as silica, alumina (especially tabular alumina), porcelain, silicon carbide, zirconia, fired shapes of clay, magnesia, chrome, feldspar, magnesia-lime (burnt dolomite), olivine, and the like. The shape of the individual packing element likewise is not critical. It can be as rings, saddles, and the like. The packing element can vary in size between a fraction of an inch and several inches, but generally a size in the range of ¼" to 4" is suitable. Such packing materials are well known and are described, e.g., in Kirk-Othmer, Encyclopedia of Chemical Technology, 2nd Edition, vol. 1, pp. 44–75.

The tabular alumina packing element used herein was in the form of ¼" spheres.

The silicon carbide was 3/16" diameter by 3/16" long pellets.

The porcelain was porcelain grinding balls, ½–1" in diameter.

The dimensions and shape of the packed column are not critical. These variables, taken with the rate of flow of the reaction mixture through the packing, should provide an average residence time in the packed column of at least 0.001 minute. Generally, residence times can be as long as 1–5 minutes, depending on the physical design of the plant. Times in excess of these are still technically suitable, but offer no further anti-reversion properties to the APP product.

All the packing can be in one portion of the column, or it can be divided into two or more sections which can be separated by any desired length of reaction pipe. Typically, the total length of the packing is at least about 1/10 the total length of the reaction pipe. There is no maximum imposed by technical reasons, since indeed the entire column can be packed. However, for economic and other reasons, it is preferred that the packing be about 1/10–1/2 the length of the reaction pipe, or even more preferably, about 2/10–4/10 the total length of the reactor pipe. The flow through the packing can be up, down, horizontal, or any combination of them.

Table 1 is a further measure of the success of the packed column which can be read in conjunction with FIG. 1. In this table, TPA means total phosphoric anhydride (i.e., $P_2O_5$).

TABLE 1.—PERCENT OF POLYPHOSPHATES REMAINING IN SOLID AMMONIUM POLYPHOSPHATE AFTER EXTENDED STORAGE PERIODS

| Sample No. | Original TPA, percent | Original non-ortho $P_2O_5$, percent of original TPA | Type packing | APP age, mos. | Percent of original non-ortho $P_2O_5$ remaining | APP age, mos. | Percent of original non-ortho $P_2O_5$ remaining |
|---|---|---|---|---|---|---|---|
| 1 | 59.48 | 31.5 | Tabular alumina | 7 | 100 | 16 | 71.0 |
| 2 | 59.57 | 33.9 | do | 7 | 94.5 | 16 | 64.0 |
| 3 | 59.51 | 28.3 | do | 8 | 93.0 | 16 | 66.0 |
| 4 | 59.62 | 40.4 | Porcelain | 10 | 83.0 | | |
| 5 | 60.04 | 35.3 | do | 9 | 81.0 | 17 | 65.0 |
| 6 | 58.18 | 24.17 | None | 1 | 100 | | |
| 7 | 57.97 | 28.3 | do | 4 | 86 | | |
| 8 | 58.57 | 34.3 | do | 5 | 81 | | |
| 9 | 58.80 | 33.0 | do | 6 | 83 | | |
| 10 | 60.10 | 29.3 | do | 9 | 74 | | |

If ammonium polyphosphate as prepared in the prior art is dissolved in water, its rate of hydrolysis, as may be expected, is higher than when it stands in storage, as a solid. Thus, ammonium polyphosphate prepared exactly as that of this invention except that it was not passed through a packed column, hydrolyzes at 70° F. at the rate of about 5.5 percent per month. When made using a packed column, the rate of hydrolysis in liquid solution is much less. In fact, when using the preferred packing material, tabular alumina, hydrolysis is generally nearly zero even after several months.

Results obtained in Examples 6–11 are averages of the many samples tested at the corresponding time intervals.

Figure 2:
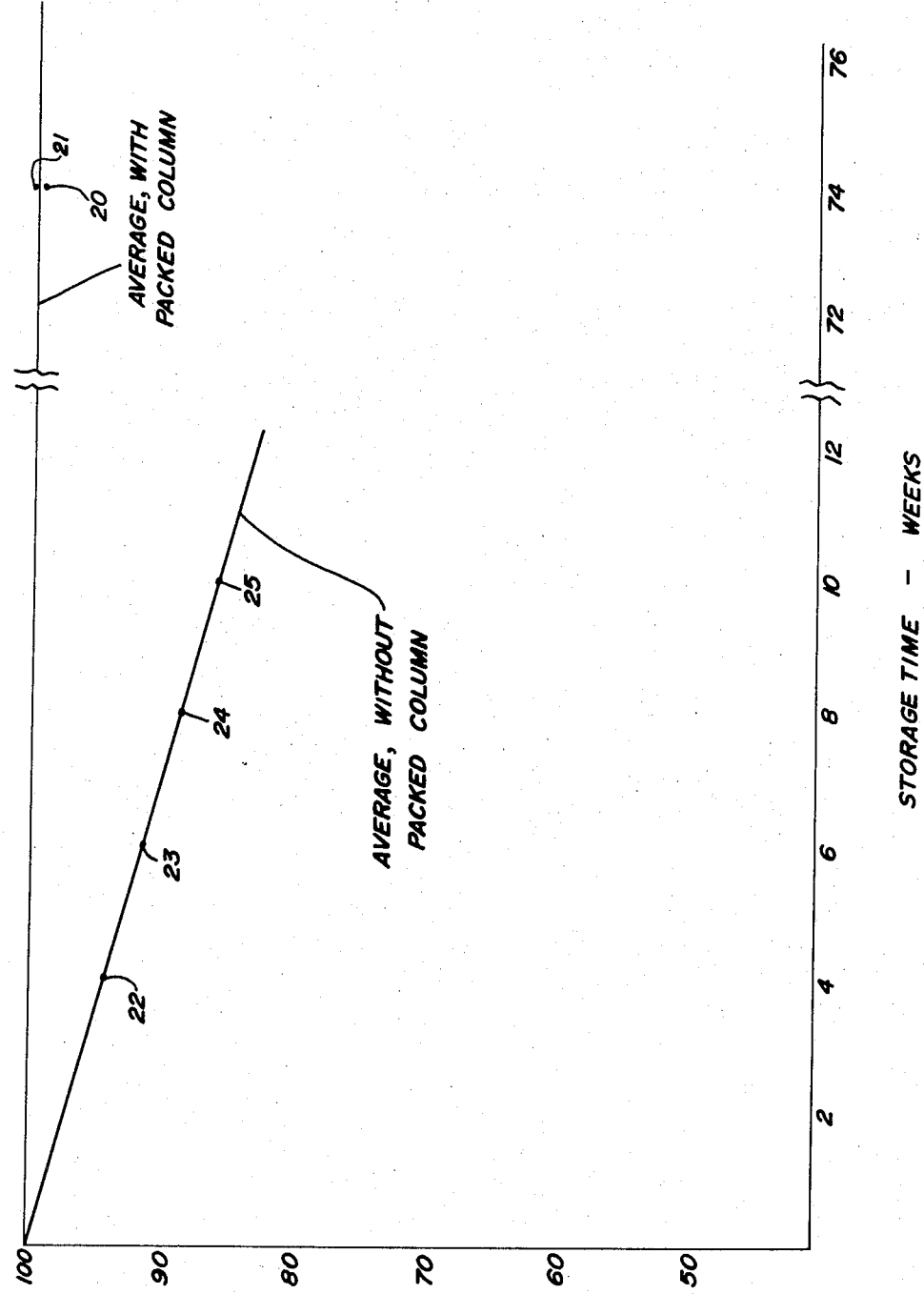
FIG. 2 is a graph similar to FIG. 1 which compares this invention to APP prepared not using this invention and then used to prepare a liquid fertilizer.

Turning now to Table 2, it can be seen that hydrolysis is virtually eliminated if the ammonia polyphosphate is mixed in an aqueous solution and stored as a fertilizer product. Table 2 should be read in conjunction with FIG. 2.

TABLE 2.—EFFECT OF PACKED COLUMN ON HYDROLYSIS OF PREPARED FERTILIZER

| Sample No. | Packing | Original $P_2O_5$ | Original non-ortho $P_2O_5$, percent of original $P_2O_5$ | Age, wks. | Percent of original non-ortho $P_2O_5$ remaining |
|---|---|---|---|---|---|
| 20 | Tabular alumina | 59.6 | 23.9 | 74 | 99 |
| 21 | do | 60.7 | 27.0 | 74 | 100 |
| 22[1] | None | 59.05 | 20.3 | 4 | 94 |
| 23 | do | 59.05 | 20.3 | 6 | 91.5 |
| 24 | do | 59.05 | 20.3 | 8 | 88.5 |
| 25 | do | 59.05 | 20.3 | 10 | 86 |

[1] Same sample analyzed at different time periods.

All samples in the above table were prepared in the following manner: freshly made solid ammonium polyphosphate was mixed with water and ammonium hydroxide to produce a fertilizer solution containing 10 percent nitrogen and 34 percent $P_2O_5$, producing a standard fertilizer, "10–34–0."

Another of the many problems heretofore unsolved in the production of liquid fertilizers has been sludging. We have found that the amount of sludging which occurs after the ammonia polyphosphate prepared by a system using a packed column is mixed with water and ammonium hydroxide to form a liquid fertilizer is often significantly less than when ammonium polyphosphate prepared without a packed column is used.

Turning now to Table 3, it can be seen that the use of a packed column may in certain cases significantly reduce the formation of sludge.

TABLE 3.—SLUDGE FORMATION WHEN USING A PACKED COLUMN

| Sample No. | Packed column | Time | Volume percent sludge |
|---|---|---|---|
| 30 | None | 34 days | 10.8 |
| 31 | Silicon carbide | do | 6.5 |
| 32 | Tabular alumina | 17 months | 0 |

In each case the samples were prepared by mixing the ammonium polyphosphate with water and ammonium hydroxide to form a liquid fertilizer, "10–34–0." In each case the ammonium polyphosphate was stirred while cooling. In all cases the temperature of the reactants $H_3PO_4$ and $NH_3$ was initially at 300° F.±5°, the maximum temperature of the reaction was 470° F.±5°, and the rate of entry of the phosphoric acid into the mixing tube was 688 cc. per minute. In samples 30 and 32 the ammonia entered the mixing tube at the rate of 237 cc. per minute, and in sample 33 the rate was 189 cc. per minute.

In Tables 1–3 the packed column was fully packed, and the ratio of length of the packed column to length of reaction pipe was 6:29.

Figure 3:
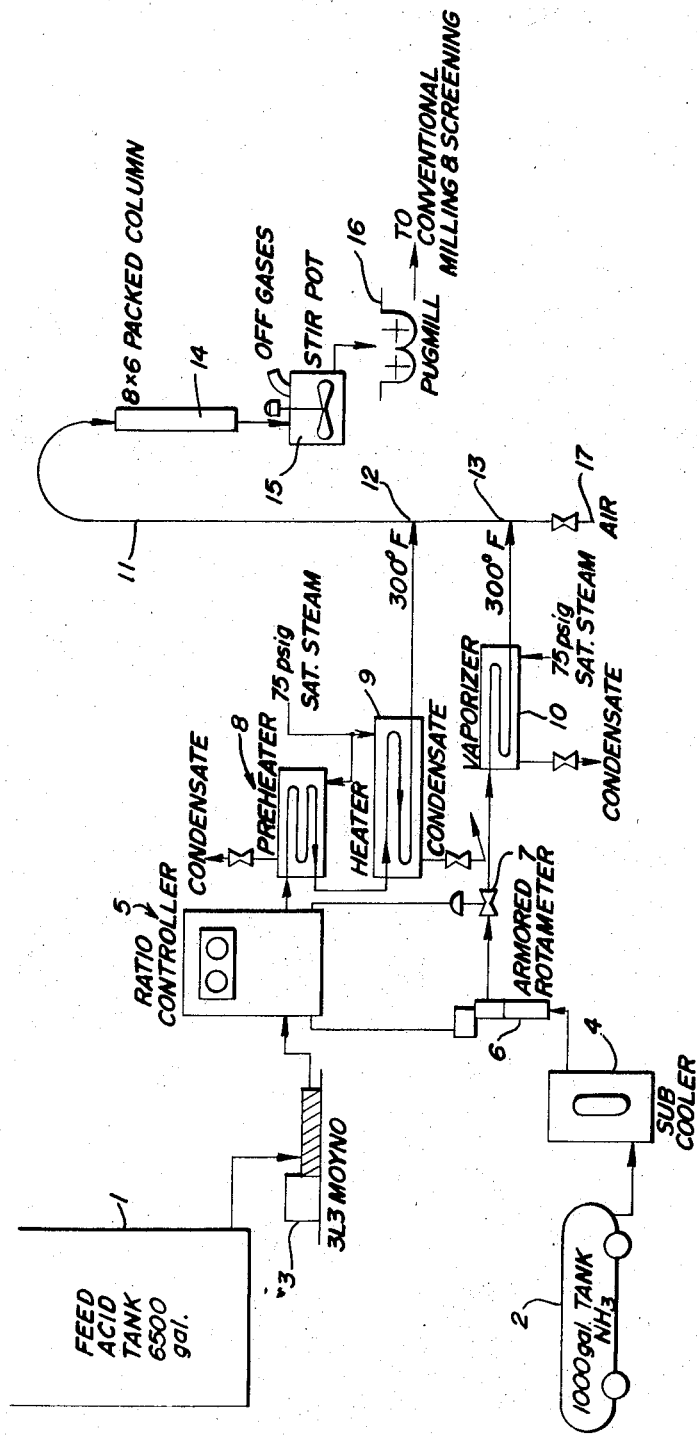
FIG. 3 is a drawing which represents the invention in a plant scale embodiment.

FIG. 3 illustrates the process used to prepare ammonium polyphosphates by making use of a packed column in a plant scale embodiment. Phosphoric acid from a storage vessel is pumped by pump 3 via a ratio controller 5 to a pre-heater 8, then to a heater 9. Ammonia from an ammonia tank car 2, is transferred to an armored rotameter 6 via a cooler 4. A controller valve 7 which is controlled by a ratio controller 5 releases the ammonia to the vaporizer 10. Saturated steam at 75 p.s.i.g. is utilized by each of the heaters 8 and 9 and by the vaporizer 10. The phosphoric acid and ammonia then enter a mixing tube, or pipe line reactor 11 at entrances 12 and 13. The temperatures of the two reactants are preferably about 300° F. but the range of 275–325° F. is also suitable. The rate at which the phosphoric acid enters the mixing tube 11 is about 4,300 pounds per hours. The rate at which the ammonia enters the mixing tube 11 is about 583 pounds per hour. At start up, compressed air is introduced at 17 to prevent the phosphoric acid from flowing back down into the ammonia inlet system 13. As soon as the ammonia is introduced and the reaction is well underway, the air is turned off. At these rates approximately 2 tons per hour of ammonium polyphosphate is produced. The dimensions of the reactor 11 are as follows: from the base to the neck is 29 feet, the neck is 3 feet long, and from the neck to the packed column is a distance of 6 feet. A constricting nozzle may be utilized at the discharge end of the reactor to maintain sufficient internal pressure to prevent boiling. From the reactor 11 the mixture passes through a packed column 14 which is 6 feet long and has an internal diameter of 8 inches and then to a stir pot 15 where the now liquid mixture of ammonium polyphosphate is allowed to cool and disengage residual steam while it is being stirred. The retention time in the packed column is approximately 0.0116 minutes, but this can be as high as 0.0348 minutes, or even higher.

When this invention is performed in the laboratory there will, naturally, be the need for smaller and slightly different equipment. Instead of using heated steam, an oil or Dowtherm heater may be utilized. The size of the reactor unit and packed column will also be smaller in the laboratory equipment. In one embodiment the reactor has the following dimensions: 72 inches from the base to the neck, a 30-inch neck, and a 19-inch span from the neck to the packed column. The packed column in this particular embodiment has an internal diameter of 2 inches, is 38 inches long, and is attached to the stir pot by a 27-inch tube. The reactants in this embodiment take an average of about $9/10$ seconds to pass through the reactor to the stir pot and remain in the packed column for an average of about $3/10$ seconds when the flow rate of the phosphoric acid is 680 cc. per minute and that of the ammonia is 189 cc. per minute. An increase in the flow rate of the ammonia decreases the retention time in the reactor and packed column.

Although the reasons why a packed column is successful in reducing hydrolysis are not known, the above data shows that when the ammonium polyphosphate is passed through a packed column a product is formed which shows much less tendency to hydrolyze or to form sludge when used in preparing liquid fertilizer.

The basic invention to which the addition of the packed column is an improvement is described in detail in copending U.S. application Ser. No. 588,034 filed Oct. 20, 1966 now Pat No. 3,649,175 in the name of Casimer C. Legal, Jr. (one of the herein joint inventors) and assigned to the same assignee of the instant invention. The invention of said U.S. Ser. No. 588,034 is also set forth and described in detail in British Pat. No. 1,153,707, and said British patent is incorporated herein by reference. The use of a stirring pot in association with the pipe line reactor described in British Pat. No. 1,153,707 is further described in detail in U.S. Ser. No. 750,138 now Pat. No. 3,503,706 filed Aug. 8, 1968 in the name of Casimer C. Legal, Jr. and assigned to the same assignee as the instant application. The specification of said U.S. Ser. No. 750,138 now Pat. No. 3,503,706 is incorporated herein by reference.

PREFERRED EMBODIMENTS

Our research in developing the herein described invention has established several preferred embodiments.

With respect to the packing it is preferred that this be a material analyzing very high in alumina ($Al_2O_3$). In this category are included packing materials such as tabular alumina, the high alumina clays, synthetic aluminates of a vitreous and refractory character, and the like. Preferably, these materials are used in small solid pieces, e.g., pellets, and suitably ¼ inch in cross section to about 1 inch.

The packing works best on freshly prepared hot ammonium polyphosphate reaction mixes made up from wet process phosphoric acid and anhydrous ammonia and still containing the water brought into the mix by the wet process phosphoric acid. This reaction mixture is preferably hot, having a temperature in the range of 400 to 500° F., and is preferably under sufficient pressure to prevent boiling within the packing system. Such ammonium polyphosphate reaction mixes are best obtained by the use of a pipe line reactor, such as that described in copending U.S. Ser. No. 588,034. The packing section is preferably elongated, i.e., it should be substantially longer in the direction of movement of the mix than in its diameter. Considering only linear dimensions, it is further preferred that the packed column be about $2/10$ to $4/10$ the length of the pipe line reactor.

There are a variety of grades of wet process phosphoric acid that can be used, and these vary as to their $P_2O_5$ content from a low of about 50% up to about 58%. Although best results are obtained when using the packed column in association with a stirring pot, such as the stirring pot shown in U.S. Ser. No. 750,138, now Pat. No. 3,503,706 a substantial improvement is obtained, other things being the same, simply by using the packed column as herein described, without the stirring pot. If the ammonium polyphosphate product is to be discharged immediately into water to make up a fluid fertilizer, then, of course, the stirring pot is superfluous. In this connection by the use of the term "stirring pot" is meant substantially any means for agitating the molten ammonium polyphosphate mix emerging from the reactor system into a collection vessel maintained substantially at atmospheric pressure. One such vessel is shown in the aforesaid U.S. Ser. No. 750,138, now Pat. No. 3,503,706 but it is to be understood that any equivalent device for agitating the melt to permit rapid disengagement of steam is included within the term stirring pot. In such device, stirring is carried out preferably for 30 seconds to 30 minutes.

We claim:

1. In apparatus for the preparation of ammonium polyphosphate comprising a source of phosphoric acid and a source of liquid ammonia; a heater to pre-heat the acid, a vaporizer to change the liquid ammonia to a hot gas, and a reaction pipe in which the acid and gaseous ammonia are combined and reacted; the improvement comprising a packed column containing an inert refractory packing following the reaction pipe, the length of the packing in the column being about $1/10$–½ the length of the reaction pipe.

2. The apparatus according to claim 1 in which the packing of the packed column is tabular alumina, silicon carbide or porcelain.

3. The apparatus according to claim 1 in which a stirring pot is connected to the packed column so as to receive the effluent of the packed column.

4. The apparatus according to claim 3 in which the length of the packing in the packed column is about $2/10$ to $4/10$ the length of the reaction pipe.

References Cited

UNITED STATES PATENTS

| | | | |
|---|---|---|---|
| 3,301,657 | 1/1967 | Dee et al. | 71—43 |
| 3,449,107 | 6/1969 | Chapman et al. | 71—43 X |
| 3,502,441 | 3/1970 | Hudson | 23—259.1 |
| 3,503,706 | 3/1970 | Legal, Jr. | 71—43 X |

JOSEPH SCOVRONEK, Primary Examiner

U.S. Cl. X.R.

23—259.3; 423—310